US006578246B2

(12) United States Patent
Chen

(10) Patent No.: US 6,578,246 B2
(45) Date of Patent: Jun. 17, 2003

(54) DISASSEMBLING DEVICE

(75) Inventor: Chun-Ting Chen, Tainan (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/097,048

(22) Filed: Mar. 12, 2002

(65) Prior Publication Data

US 2002/0129479 A1 Sep. 19, 2002

(30) Foreign Application Priority Data

Mar. 19, 2001 (TW) ........................................ 90204105 U

(51) Int. Cl.[7] ................................................ B23P 19/04
(52) U.S. Cl. ........................ 29/239; 29/281.1; 269/291; 269/44
(58) Field of Search .......................... 29/239, 235, 700, 29/281.1; 269/296, 291, 44, 297, 282, 289 R, 900, 73

(56) References Cited

U.S. PATENT DOCUMENTS 4,794,687 A * 1/1989 Peters et al. .................. 29/559
5,060,920 A * 10/1991 Engibarov .................. 269/282
5,305,992 A * 4/1994 Kish ........................... 269/71
5,758,870 A * 6/1998 Weaver ...................... 269/329
5,816,568 A * 10/1998 Fox ............................ 269/71
6,126,158 A * 10/2000 Engibarov .................. 269/136

* cited by examiner

*Primary Examiner*—Lee D. Wilson
(74) *Attorney, Agent, or Firm*—Ladas & Parry

(57) ABSTRACT

A disassembling device for disassembling a housing composed of a first member and a second member. The first member is attached to the second member by engaging a first engaging portion with a second engaging portion. The disassembling device comprises at least one first shifting mechanism and at least one second shifting mechanism. The first shifting mechanism is used to detach the second member from the first member. The first shifting mechanism comprises at least one first compressing portion while the second shifting mechanism comprises at least one second compressing portion. When the housing is to be disassembled, the second compressing portion detaches the first engaging portion from the second engaging portion partially. Then, the first compressing portion is moved to detach the second member from the first member completely.

20 Claims, 8 Drawing Sheets

DISASSEMBLING DEVICE

BACKGROUND OF THE INVENTION

1. Field of the Invention

The present invention relates to a disassembling device, and in particular to a disassembling device for disassembling a housing comprising two members.

2. Description of the Related Art

Generally speaking, a housing of a device (such as a CD player) is composed of an upper member and a lower member. The upper member is engaged with the lower member by plural protruding portions and recessed portions formed therein. Between the upper and the lower member is a compact seam. While disassembling the housing, a user has to insert a flat tool into the seam and exert great efforts to detach the upper member from the lower member. This may cause the housing to break and is inconvenient.

SUMMARY OF THE INVENTION

An object of the invention is to provide a disassembling device for disassembling a housing composed of a first member and a second member. The first member has at least one first engaging portion and the second member has at least one second engaging portion. The first engaging portion is engaged with the second engaging portion. The disassembling device comprises a base for receiving the housing; and at least one first compressing portion disposed on one side of the base and moving between a first position and a second position, the first compressing portion located at one side of the housing and pushing against the housing so as to detach the first engaging portion from the second engaging portion.

A detailed description will be given by the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

First Embodiment

Figure 1A:
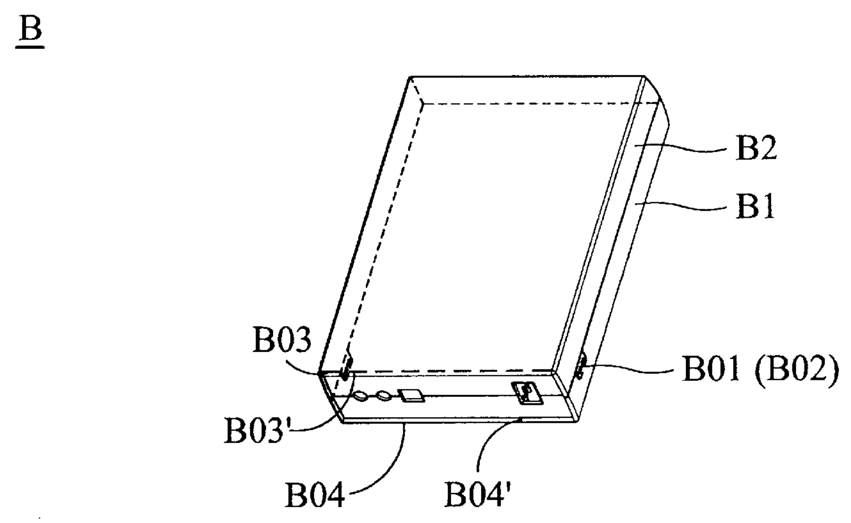
FIG. 1A is a perspective view of a housing (B)
Figure 1B:
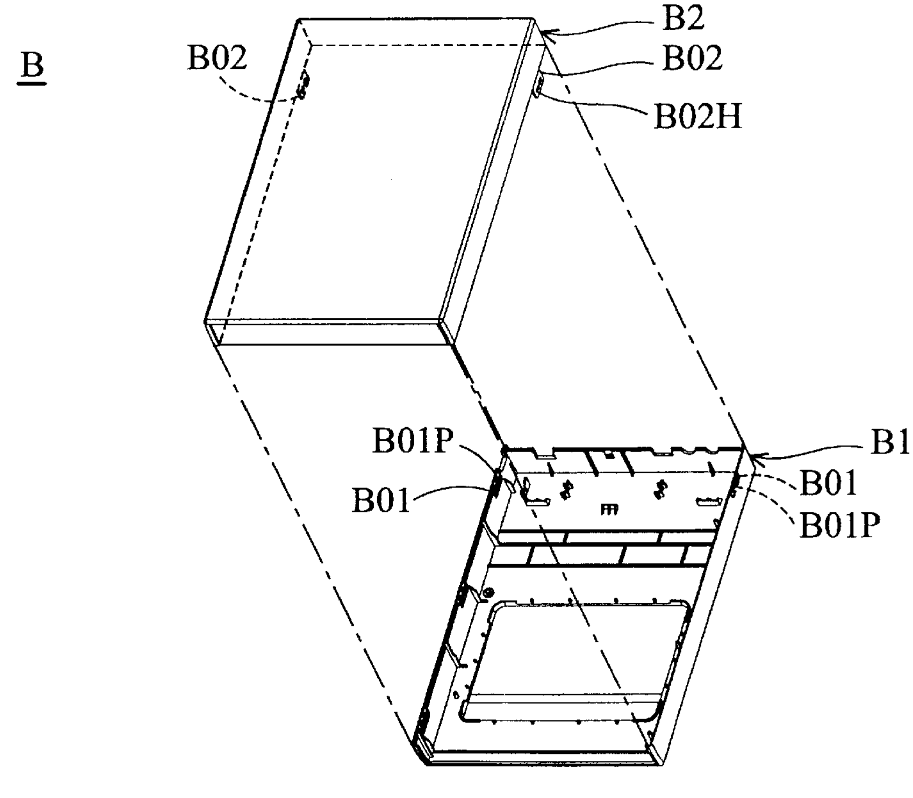
FIG. 1B is an exploded perspective view of the housing (B) according to FIG. 1A.

Referring to FIG. 1A and FIG. 1B, the rectangular and hollow housing B is composed of a first member B1 and a second member B2. There are two first engaging portions B10 formed on inner sides of the first member B1. A plurality of protrusions B01P are formed on the first engaging portions B10. Two second engaging portions B02 are formed on inner sides of the second member B2, which are corresponding to the two first engaging portions B01. A plurality of positioning holes B02H are formed on the second engaging portions B02.

The first member B1 is attached to the second member B2 to form the housing B by inserting the protrusions B01P of the first engaging portions B01 into the positioning holes B02H of the second engaging portions B02.

A flange B03 is formed on the outer sides of the second member B2 and a flange B04 is formed on the outer sides of the first member B1. In addition, a stepped plane B03' is formed on the flange B03 and a stepped plane B04' is formed on the flange B04.

Figure 2A:
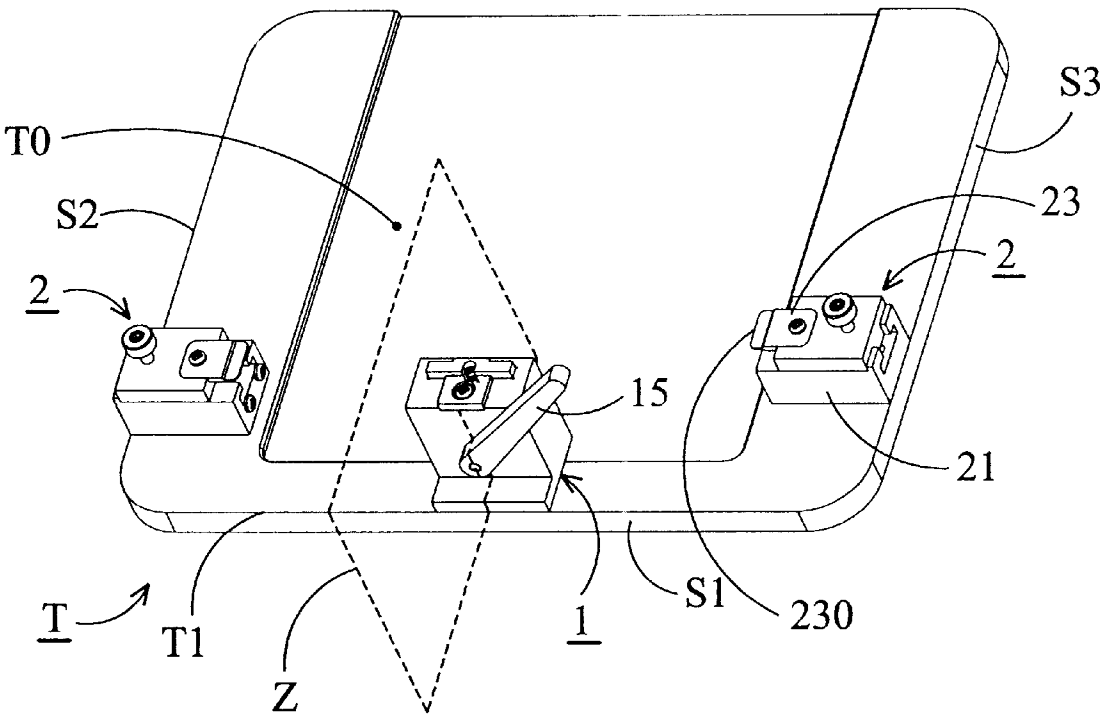
FIG. 2A is a perspective view of the disassembling device (T) of the first embodiment of the invention.

Referring to FIG. 2A, the disassembling device T comprises a base T1, a first shifting mechanism 1 and two second shifting mechanisms 2. The base T1 includes a base plane T0, a first side S1, a second side S2 and a third side S3. The base plane T0 is used to load the housing B. The first shifting mechanism 1 and the two second shifting mechanisms 2 are disposed on the first side S1, the second side S2 and the third side S3, respectively.

Figure 2B:
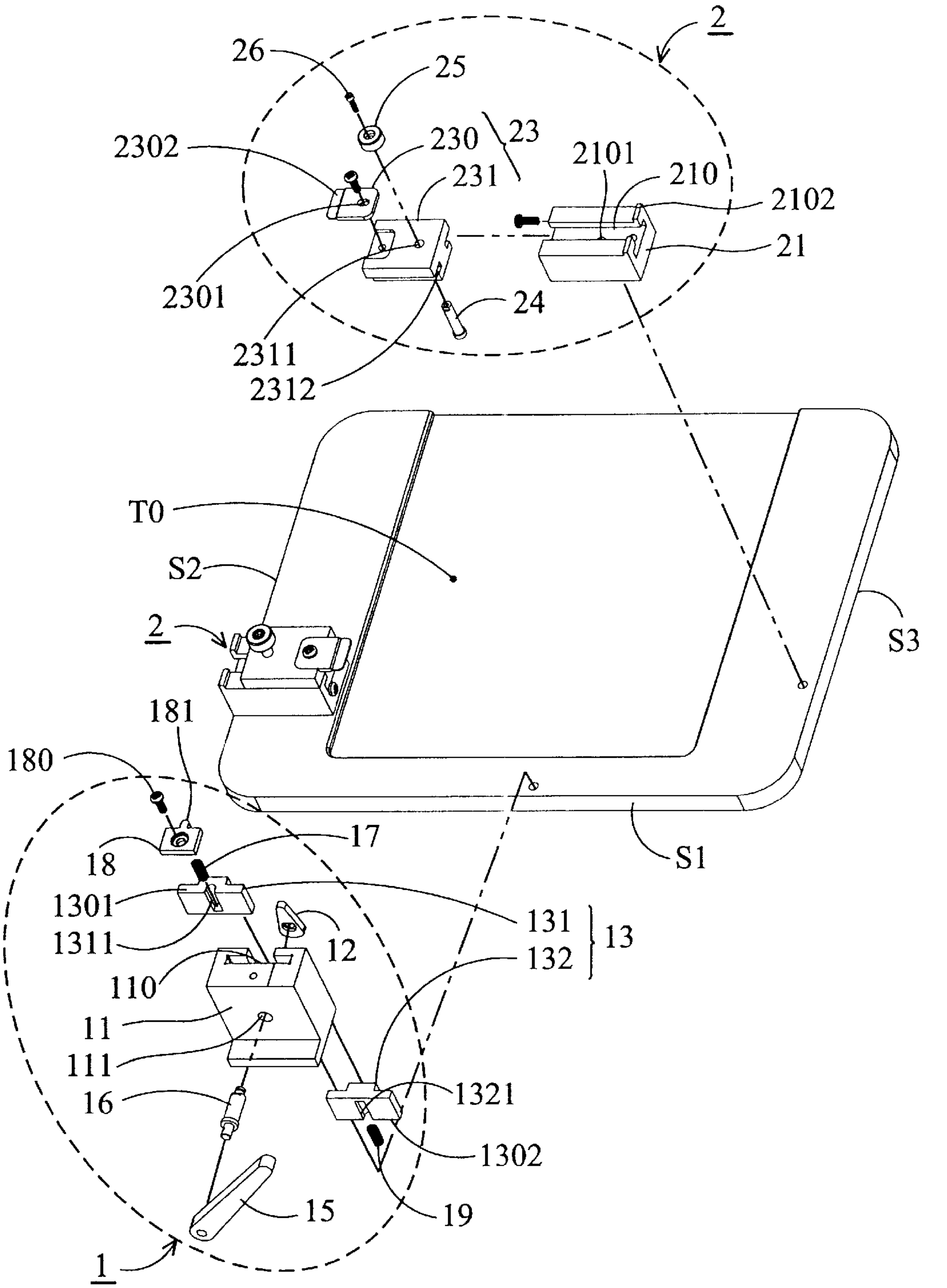
FIG. 2B is an exploded perspective view of the disassembling device according to FIG. 2A.
Figure 2C:
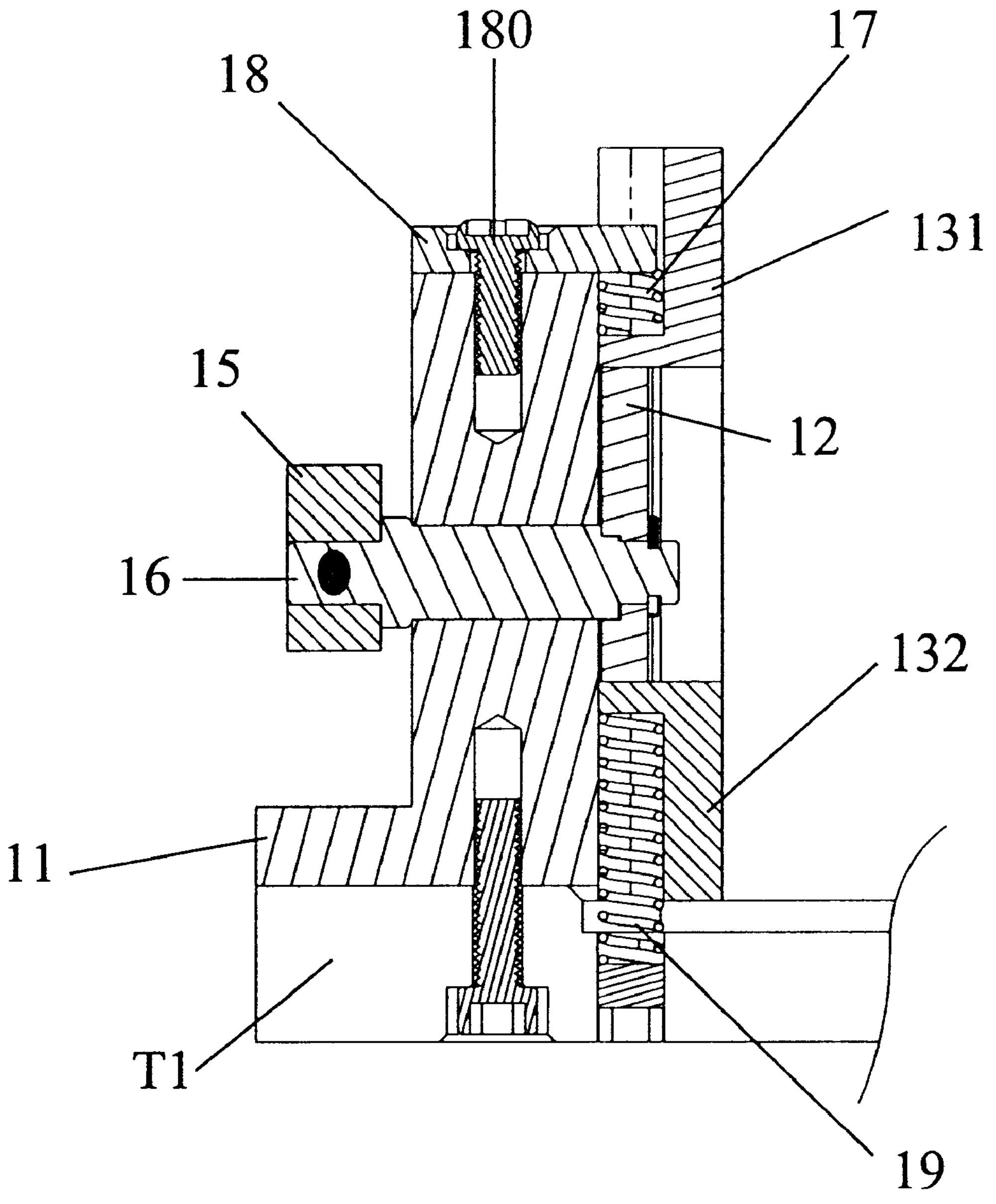
FIG. 2C is a cross-sectional view taking along plane Z of the first shifting mechanism (1) of FIG. 2A.

Referring to FIG. 2B, the first shifting mechanism 1 comprises a first guiding pedestal 11, a cam 12, a first compressing portion 13, a lever 15, a shaft 16 and a plank element 18. The first compressing portion 13 is composed of an upper sliding element 131, a lower sliding element 132, an upper resilient element 17 and a lower resilient element 19.

The first guiding pedestal 11 is disposed on the first side S1 and comprises a first guiding groove 110 and a through hole 111. The upper sliding element 131 and the lower sliding element 132 are spaced a distance apart and movably disposed in the first guiding groove 110. In addition, the upper sliding element 131 has a sliding groove 1311 while the lower sliding element 132 has a sliding groove 1321. The upper resilient element 17 and the lower resilient element 19 are placed in the sliding groove 1311 and the sliding groove 1321, respectively. The upper resilient element 131 and the lower resilient element 132 can return to their original positions by the resilient force of the resilient element 17. The shaft 16 is disposed in the first guiding pedestal 11 via the through hole 111. The lever 15 and the cam 12 are disposed on two ends of the shaft 16, respectively. The cam 12 is interposed between the upper sliding element 131 and the lower sliding element 132. The upper sliding element 131 and the lower sliding element 132 can move different distance by rotating the lever 15 to actuate the cam 12. The plank element 18 is fixed to the first guiding pedestal 11 by a bolt 180 and has a protrusion 181 fitting in the sliding groove 1311 of the upper sliding element 131. When the upper sliding element 131 moves upward by rotation of the cam 12, the protrusion 181 can prevent the upper sliding element 131 from sliding out of the first guiding pedestal 11.

The second shifting mechanism 2 comprises a second guiding pedestal 21 and a second compressing portion 23. The second guiding pedestal 21 includes a second guiding groove 210 having a resilient protrusion 2101. The second compressing portion 23 is composed of a plank element 230 and a sliding element 231. The sliding element 231 has a through hole 2311. A shaft 24 penetrates the through hole 2311 and protrudes upward from the sliding element 231. A casing element 25 is fixed on the shaft 24 by a bolt 26. An engaging portion 2312 is formed on the bottom of the through hole 2311 in order to engage with the resilient protrusion 2101. One end portion 2301 of the plank element 230 is fixed to the sliding element 231 and the other end portion 2302 is flat. When the resilient protrusion 2101 is located at the engaging portion 2312, the second compressing portion 23 is located at a third position near the base plane T0 (as shown in FIG. 3B). When the casing element 25 is pressed, the shaft 24 can push against the protrusion 2101 downward, thus making the protrusion 2101 detach from the engaging portion 2312. At this time, the sliding element 231 can be moved in the second guiding groove 210. When the sliding element 231 is moved to the outer end of the second guiding pedestal 21, two blocks 2102 formed on the outer end of the second guiding groove 210 are used to withstand the sliding element 231, thus preventing the sliding element 231 from sliding out of the second guiding pedestal 21. At this time, the second compressing portion 23 is located at a fourth position far away from the base plane T0 (as shown in FIG. 3A).

Figure 3A:
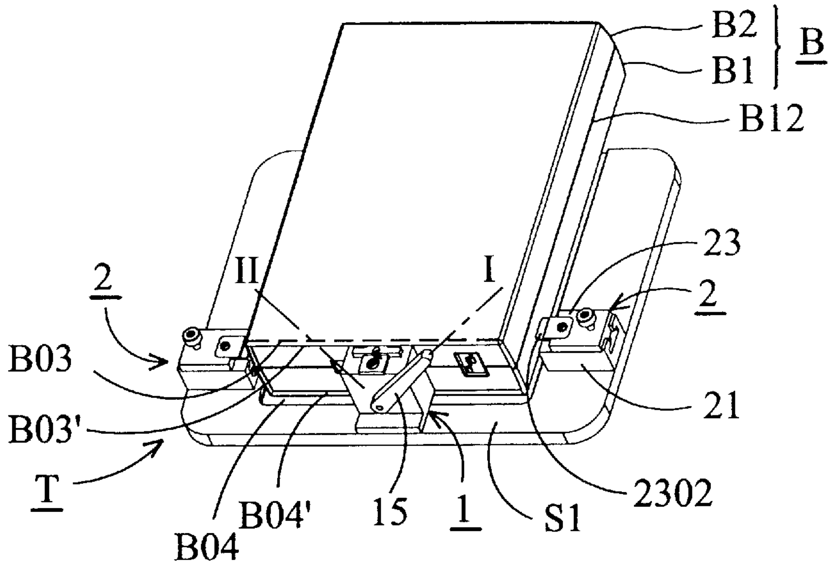
FIG. 3A shows the housing (B) placed on the disassembling device (T) according to the first embodiment.
Figure 3B:
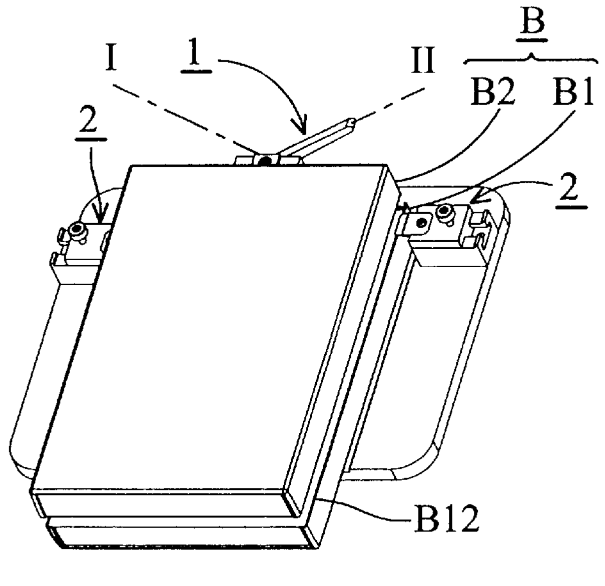
FIG. 3B is a perspective view of the disassembled housing (B)

Referring to FIG. 3A and FIG. 3B, when the housing B is placed on the base plane T0, two second shifting mechanisms 2 are adjacent to the first engaging portion B01 and the second engaging portion B02 of the housing B, respectively. The end portions 2302 of the second shifting mechanisms 2 are leveled at the seam B12 between the first member B1 and the second member B2.

The first shifting mechanism 1 is adjacent to one side of the housing B. The upper end 1301 of the upper sliding element 131 of the first compressing portion 13 is adjacent to the stepped plane B03' of the flange B03 of the second member B2, and the lower end 1302 of the lower sliding element 132 is adjacent to the stepped plane B04' of the flange B04 of the first member B1.

As shown in FIG. 3B, when the second compressing portions 23 of the second shifting mechanisms 2 is moved toward the housing B, the end portions 2302 enter the seam B12 of the housing B and push against the second engaging portions B02 of the second member B2. The second engaging portions B02 are partially detached from the first engaging portions B01 by persistent exertion. Then, the lever 15 is swung to a second position II from a first position I so as to actuate the cam 12, thus causing the upper sliding element 131 and the lower sliding element 132 of the first compressing portion 13 to move along the first guiding groove 110 of the first guiding pedestal 11. At this time, the upper end 1301 of the upper sliding element 131 pushes against the stepped plane B03' of the flange B03 of the second member B2 while the lower end 1302 of the lower sliding element 132 pushes against the stepped plane B04' of the flange B04 of the first member B1. Eventually, the second member B2 is completely detached from the first member B1 by persistent exertion.

Second Embodiment

Figure 4A:
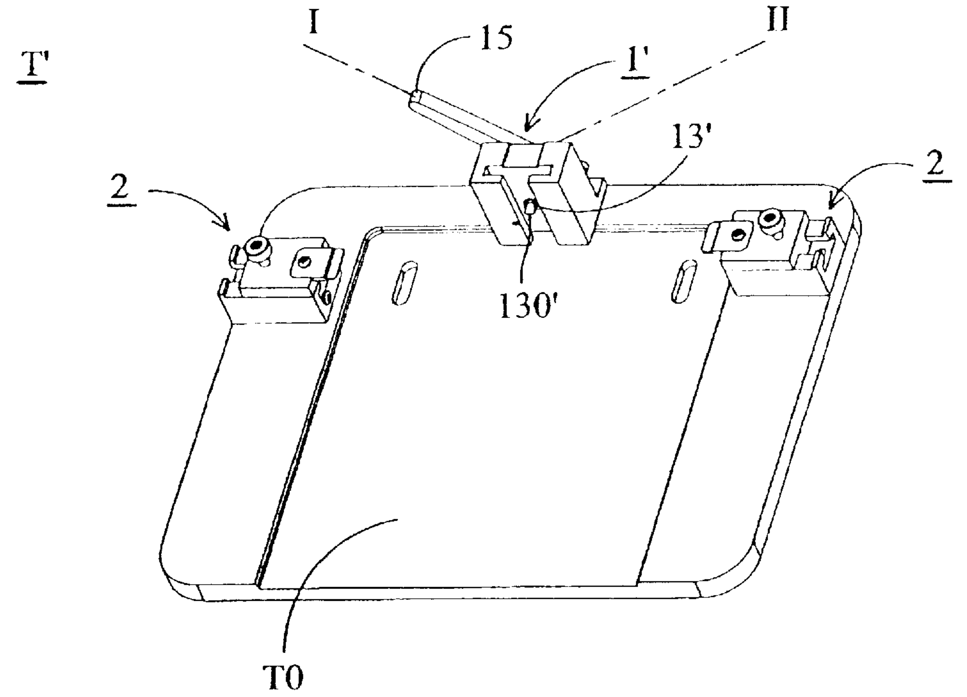
FIG. 4A is a perspective view of the disassembling device (T') of the second embodiment of the invention.
Figure 4B:
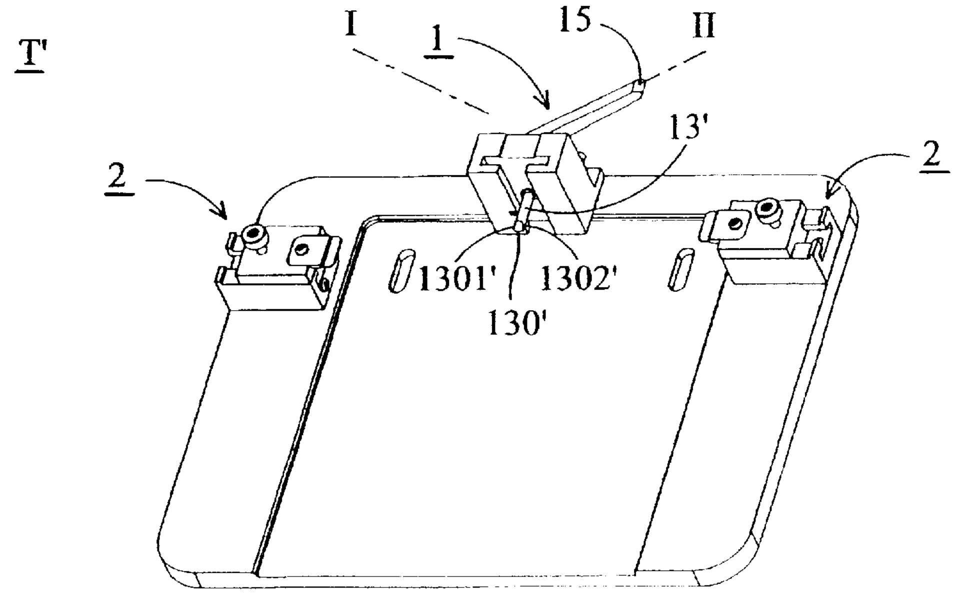
FIG. 4B shows another state of the disassembling device (T') according to FIG. 4A.

Referring to FIG. 4A and FIG. 4B, the disassembling device T' comprises a base plane T0, a first shifting mechanism 1' and two second shifting mechanisms 2. The first shifting mechanism 1' further comprises a first compressing portion 13'. The first compressing portion 13' utilizes a sliding element to move toward the housing in a substantially perpendicular direction. The outside of the sliding element is surrounded by a spring (not shown).

An end 130' of the first compressing portion 13' has a V-like shape and has a first inclined surface 1301' and a second inclined surface 1302'. The first compressing portion 13' is disposed in the first guiding pedestal 11 via the through hole 111 and actuated by the lever 15. The lever 15 can be pushed and swung between a first position I and a second position II so as to actuate the first compressing portion 13' to rotate and move.

Figure 5:
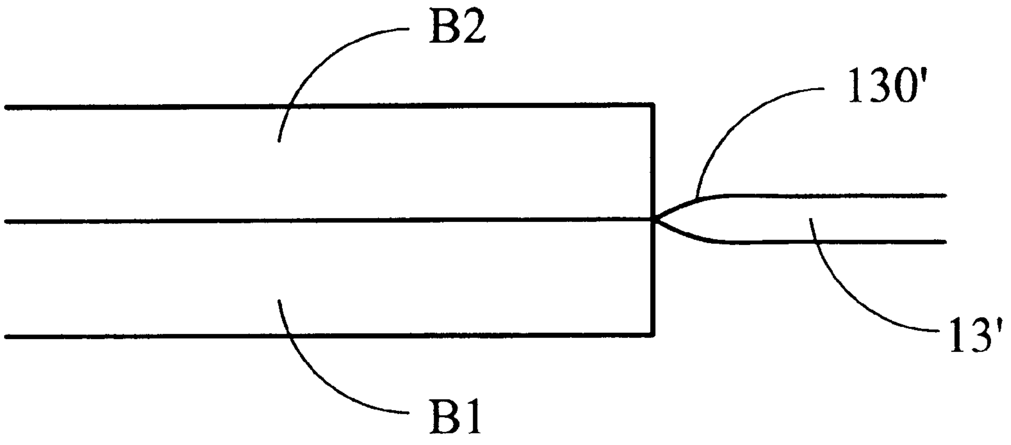
FIG. 5 shows an end portion (130') of the disassembling device (T') touching the housing (B)

Referring to FIG. 5, when the housing B is placed on the base plane T0, the two second shifting mechanisms 2 are adjacent to the first engaging portion B01 and the second engaging portion B02. The end 130' of the first compressing portion 13' and the ends 2302 of the two second shifting mechanisms 2 are leveled at the seam B12 between the first member B1 and the second member B2.

When the second compressing portions 23 of the second shifting mechanisms 2 is moved toward the housing B, the ends 2302 enter the seam B12 and push against the second engaging portions B02 of the second member B2. The second engaging portions B02 are partially detached from the first engaging portions B01 by persistent exertion. When the lever 15 is swung to the second position II from the first position I, the end 130' of the first compressing portion 13' is moved toward the seam B12 via the swing of the lever 15. Eventually, the second member B2 is completely detached from the first member B1 by the first inclined surface 1301', the second inclined surface 1302' of the end 130' and the rotation of the first compressing portion 13'.

Figure 6A:
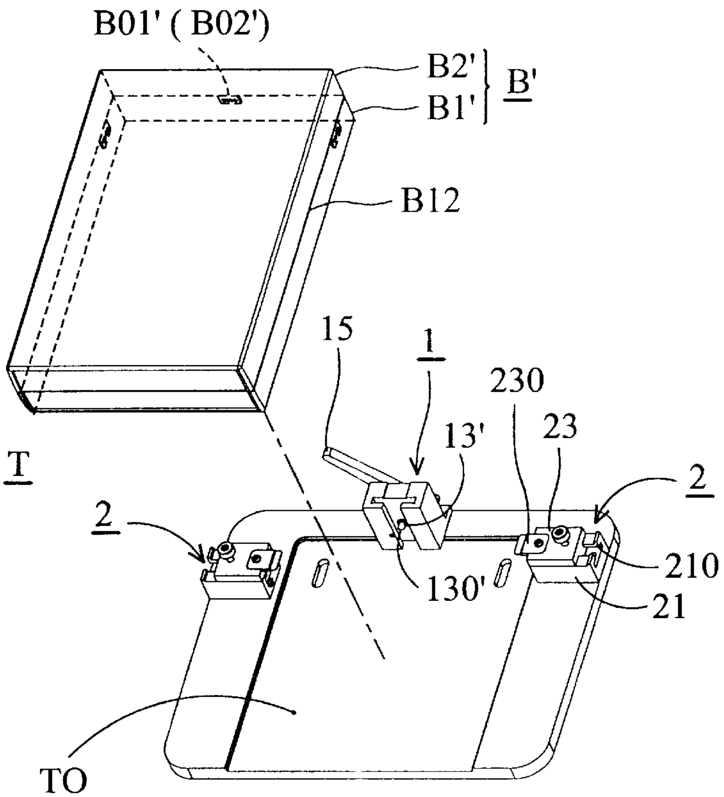
FIG. 6A is a perspective view showing the disassembling device (T') and a housing (B')
Figure 6B:
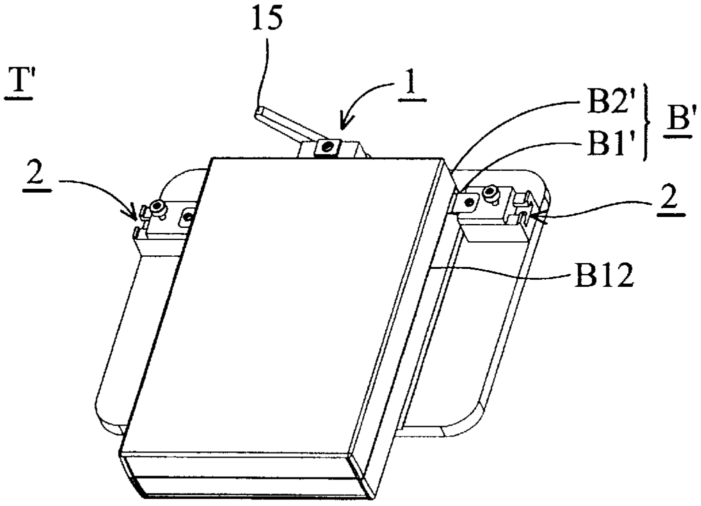
FIG. 6B shows the housing (B') placed on the disassembling device (T').

Referring FIG. 6A and FIG. 6B, another housing B' is composed of a first member B1' and a second member B2'.

The difference between this embodiment and the second embodiment is that the housing B' has another first engaging portion B01' disposed on the first member B1' and another second engaging portion B02' disposed on the second member B2'. The second engaging portion B02' is used to engage with the first engaging portion B01'. Under interaction of the two end portions 2302 of the two second shifting mechanisms 2, the end portion 130' of the first compressing portion 13' can detach the first engaging portion B01' from the second engaging portion B02'.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A disassembling device for disassembling a housing comprising a first member and a second member, the first member having at least one first engaging portion and the second member having at least one second engaging portion, the first engaging portion being engaged with the second engaging portion, the disassembling device comprising:

a base for receiving the housing; and a first compressing portion disposed on a first position of the base, the first compressing portion located at one side of the housing when the housing is positioned on the base and pushing against the housing so as to detach the first engaging portion from the second engaging portion, wherein the first compressing portion comprises an upper sliding element and a lower sliding element;

a cam connected to the upper sliding element and the lower sliding element; and a lever connected to the cam, wherein movement of the lever actuates movement of the cam, which in turn forces the upper sliding element and the lower sliding element to slide away from each other, which detaches the first engaging portion from the second engaging portion and causes the first member and the second member of the housing to separate.

2. The disassembling device as claimed in claim 1, further comprising a first shifting mechanism, wherein the first compressing portion is disposed in the first shifting mechanism.

3. The disassembling device as claimed in claim 1, further comprising at least one second compressing portion disposed on a second position of the base, whereby the second compressing portion pushes against the housing to detach the first member from the second member when the first compressing portion pushes against the housing to detach the first engaging portion from the second engaging portion.

4. The disassembling device as claimed in claim 3, further comprising a second shifting mechanism, wherein the second compressing portion is disposed in the second shifting mechanism.

5. The disassembling device as claimed in claim 4, wherein the second shifting mechanism further comprises a lever for actuating the second compressing portion.

6. The disassembling device as claimed in claim 3, wherein the second compressing portion comprises a sliding element having an inclined surface on its one end and the first member is detached from the second member by the inclined surface when the end is moved to a seam formed between the first member and the second member.

7. The disassembling device as claimed in claim 3, wherein the base further comprises a base plane for loading the housing, the base plane having a first side and a second side, whereby the first compressing portion and the second compressing portion are disposed on the first side and the second side, respectively.

8. The disassembling device as claimed in claim 3, wherein the housing further comprise at least one flange, whereby the second compressing portion pushes against the flange to detach the first member from the second member when the first compressing portion detaches the first engaging portion from the second engaging portion.

9. The disassembling device as claimed in claim 1, wherein the first compressing portion further comprises a sliding element and a plank element, one end of the plank element being fixed to the sliding element and the other end being a flat end, whereby the flat end enters a seam between the first member and the second member so as to detach the second engaging portion from the first engaging portion.

10. A disassembling device for disassembling a housing comprising a first member and a second member, the first member having at least one first engaging portion and the second member having at least one second engaging portion, the first engaging portion being engaged with the second engaging portion, the disassembling device comprising:

a base for receiving the housing;

a first compressing portion disposed on a first position of the base, the first compressing portion having an upper sliding element, a lower sliding element and a cam interposed between the upper sliding element and the lower sliding element, the first member detached from the second member by movements of the upper sliding element and the lower sliding element driven by rotation of the cam; and a second compressing portion disposed on a second position of the base, the second compressing portion located at one side of the housing when the housing is positioned above the base, and the second compressing portion pushing against the housing so as to detach the first engaging portion from the second engaging portion.

11. The disassembling device as claimed in claim 10, further comprising a first shifting mechanism, wherein the first compressing portion is disposed in the first shifting mechanism, and the first compressing portion pushes against the housing to detach the first member from the second member when the first compressing portion pushes against the housing to detach the first engaging portion from the second engaging portion.

12. The disassembling device as claimed in claim 11, wherein the first shifting mechanism further comprises a lever connected to the cam by a shaft for actuating the upper and lower sliding elements of the first compressing portion.

13. The disassembling device as claimed in claim 10, further comprising a second shifting mechanism, wherein the second compressing portion is disposed in the second shifting mechanism.

14. The disassembling device as claimed in claim 10, wherein the base further comprises a base plane for loading the housing, the base plane having a first side and a second side, and the first compressing portion and the second compressing portion are disposed on the first side and the second side, respectively.

15. The disassembling device as claimed in claim 10, wherein the housing further comprises at least one flange, whereby the second compressing portion pushes against the flange to detach the first member from the second member when the first compressing portion detaches the first engaging portion from the second engaging portion.

16. The disassembling device as claimed in claim 10, wherein the second compressing portion further comprises a sliding element and a plank element, one end portion of the plank element is fixed to the sliding element while the other end portion is a flat end portion, a seam is formed between the first and second engaging portions, and the flat end portion enters the seam to detach the second engaging portion from the first engaging portion.

17. A disassembling device for disassembling a housing comprising a first member and a second member, the first member having at least one first engaging portion and the second member having at least one second engaging portion, the first engaging portion being engaged with the second engaging portion, the disassembling device comprising:

a base for receiving the housing;

a first compressing portion disposed on a first position of the base;

a second compressing portion disposed on a second position of the base, the second compressing portion located at one side of the housing when the housing is positioned above the base, and the second compressing portion pushing against the housing so as to detach the first engaging portion from the second engaging portion; and a first shifting mechanism, wherein the first compressing portion is disposed in the first shifting mechanism, and the first compressing portion pushes against the housing to detach the first member from the second member when the first compressing portion pushes against the housing to detach the first engaging portion from the second engaging portion, wherein the first shifting mechanism further comprises a lever for actuating the first compressing portion, wherein the first compressing portion further comprises an upper sliding element and a lower sliding element, and a cam is interposed between the upper sliding element and the lower sliding element and connected to the lever by a shaft, the first member detached from the second member by movements of the upper sliding element and the lower sliding element driven by rotation of the cam actuated by the lever.

18. A disassembling device for disassembling a housing comprising a first member and a second member, the first member having at least one first engaging portion and the second member having at least one second engaging portion, the first engaging portion being engaged with the second engaging portion, the disassembling device comprising:

a first side, a second side, and a third side;

a first shifting mechanism mounted on the first side, comprising a first guiding pedestal having a first guiding groove;

a first compressing portion slidably mounted in the first guiding groove; and a lever connected to the first guiding pedestal via a shaft and a through hole for actuating the first compressing portion to detach the first engaging portion from the second engaging portion; and a second shifting mechanism mounted on the second side, comprising a plank element adapted to be inserted into a seam between the first member and the second member of the housing, wherein the first compressing portion comprises an upper sliding element slidably mounted in the first guiding groove;

an upper resilient element adapted to push back the upper sliding element;

a lower sliding element slidably mounted in the first guiding groove;

a lower resilient element adapted to push back the lower sliding element; and a cam connected to the upper sliding element and the lower sliding element, wherein movement of the lever actuates movement of the cam, which in turn forces the upper sliding element and the lower sliding element to slide away from each other, which detaches the first engaging portion from the second engaging portion and causes the first member and the second member of the housing to separate.

19. The disassembling device as claimed in claim 18, wherein the second shifting mechanism further comprises a second guiding pedestal having a second guiding groove; and a second compressing portion slidably mounted in the second guiding groove, the second compressing portion comprising a sliding element having a through hole; and a shaft and a bolt that fixedly attach the plank element to the sliding element.

20. The disassembling device as claimed in claim 18, further comprising a third shifting mechanism mounted on the third side of the disassembling device, wherein structure of the third shifting mechanism is identical with the second shifting mechanism.

* * * * *